(12) United States Patent
Chen et al.

(10) Patent No.: US 11,960,164 B2
(45) Date of Patent: Apr. 16, 2024

(54) BLACK MATRIX STRUCTURE AND MANUFACTURING METHOD THEREFOR, DISPLAY SUBSTRATE, AND DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Qiang Chen, Beijing (CN); Yezhou Fang, Beijing (CN); Gaofei Xia, Beijing (CN); Xiahong Bai, Beijing (CN)

(73) Assignees: ORDOS YUANSHENG OPTOELECTRONICS CO., LTD., Ordos (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/914,800

(22) PCT Filed: Jun. 8, 2021

(86) PCT No.: PCT/CN2021/098937
§ 371 (c)(1),
(2) Date: Sep. 27, 2022

(87) PCT Pub. No.: WO2022/001599
PCT Pub. Date: Jan. 6, 2022

(65) Prior Publication Data
US 2023/0333424 A1    Oct. 19, 2023

(30) Foreign Application Priority Data
Jul. 3, 2020   (CN) .......................... 202010637458.3

(51) Int. Cl.
*G02F 1/1335*   (2006.01)
*G02F 1/1339*   (2006.01)

(52) U.S. Cl.
CPC .. *G02F 1/133512* (2013.01); *G02F 1/133514* (2013.01); *G02F 1/13396* (2021.01)

(58) Field of Classification Search
CPC ...................... G02F 1/13396; G02F 1/133512
See application file for complete search history.

(56) References Cited

U.S. PATENT DOCUMENTS

2006/0159843 A1   7/2006  Sze et al.
2009/0174036 A1   7/2009  Fuller et al.
(Continued)

FOREIGN PATENT DOCUMENTS

CN      1550841 A       12/2004
CN    102117737 A        7/2011
(Continued)

OTHER PUBLICATIONS

International Search Report and Written Opinion dated Jul. 26, 2021 in corresponding International Patent Application No. PCT/CN2021/098937 (with English translation), 15 pages.

(Continued)

*Primary Examiner* — Alexander P Gross
(74) *Attorney, Agent, or Firm* — XSENSUS LLP

(57) ABSTRACT

Provided is a black matrix structure. The black matrix structure includes a plurality of black matrix strips that are intersected with each other, wherein a width the black matrix strip ranges from 2 to 2.5 microns, and a distance between any two adjacent black matrix strips in the plurality of black matrix strips ranges from 4 to 5 microns.

11 Claims, 5 Drawing Sheets

(56) References Cited

U.S. PATENT DOCUMENTS

| | | |
|---|---|---|
| 2010/0033658 A1 | 2/2010 | Tsao et al. |
| 2010/0091234 A1* | 4/2010 | Nakahata ............ G02F 1/13394 349/155 |
| 2013/0107182 A1* | 5/2013 | Hagiwara ......... G02F 1/133707 349/110 |
| 2014/0176885 A1* | 6/2014 | Okita ................ G02F 1/133512 349/106 |
| 2015/0205161 A1 | 7/2015 | Okita et al. |
| 2016/0299395 A1* | 10/2016 | Kosuge ............. G02F 1/136209 |
| 2018/0088371 A1 | 3/2018 | Li |
| 2019/0086720 A1* | 3/2019 | Yang ................. G02F 1/136209 |

FOREIGN PATENT DOCUMENTS

| | | |
|---|---|---|
| CN | 202306065 U | 7/2012 |
| CN | 102629016 A | 8/2012 |
| CN | 103117219 A | 5/2013 |
| CN | 105093760 A | 11/2015 |
| CN | 106526946 A | 3/2017 |
| CN | 107065292 A | 8/2017 |
| CN | 107390419 A | 11/2017 |
| CN | 108761893 A | 11/2018 |
| CN | 111161632 A | 5/2020 |
| JP | 2000111724 A | 4/2000 |
| JP | 2012073509 A | 4/2012 |
| JP | 2014153420 A | 8/2014 |
| KR | 20070079879 A | 8/2007 |
| TW | M593565 U | 4/2020 |

OTHER PUBLICATIONS

Chinese Office Action dated Jun. 21, 2022 in corresponding Chinese Patent Application No. 202010637458.3 (with English translation), 15 pages.

Chinese Notification to Grant Patent dated Nov. 16, 2022 in corresponding Chinese Patent Application No. 202010637458.3 (with English translation), 7 pages.

Du Jun et al., "Strengthening and Toughening Technology of Vapor Deposition Thin Film 1.1.3 Plasma", National 4 Defense Industry Press, May 2018, p. 5.

Du Jun et al., "Strengthening and Toughening Technology of Vapor Deposition Thin Film 1.1.3 Plasma", National Defense Industry Press, May 2018, p. 5.

* cited by examiner

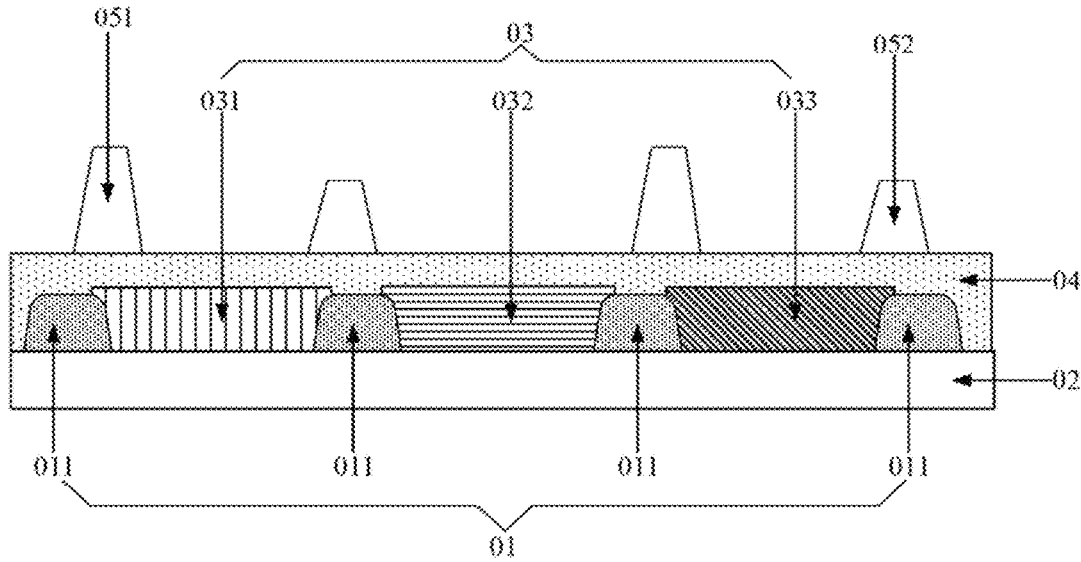

FIG. 3

| Forming an initial black matrix structure on a base substrate, the initial black matrix structure including a plurality of initial black matrix strips that are intersected with each other, wherein the plurality of initial black matrix strips are of an integral structure formed by stacking a first trapezoidal truncated cone, a cuboid, and a second trapezoidal truncated cone sequentially along a direction facing away from the base substrate, wherein an upper base face of the first trapezoidal truncated cone and an upper base face of the second trapezoidal truncated cone are in contact with two opposite faces of the cuboid respectively, an area of a lower base face of the second trapezoidal truncated cone is larger than an area of a lower base face of the first trapezoidal truncated cone, and a side face of the first trapezoidal truncated cone and a side face of the second trapezoidal truncated cone protrude from a side face of the cuboid respectively | 401 |

| Removing and partially collapsing a structure of the second trapezoidal truncated cone of the initial black matrix strips in the initial black matrix structure that protrudes from the cuboid, with a collapsed portion covering a structure of the first trapezoidal truncated cone that protrudes from the cuboid, so as to acquire a final black matrix structure | 402 |

FIG. 4

BLACK MATRIX STRUCTURE AND MANUFACTURING METHOD THEREFOR, DISPLAY SUBSTRATE, AND DISPLAY DEVICE

CROSS-REFERENCE TO RELATED APPLICATION

This application is a US national stage of international application No. PCT/CN2021/098937, filed on Jun. 8, 2021, which claims priority to the Chinese Patent Application No. 202010637458.3, filed on Jul. 3, 2020, and entitled "BLACK MATRIX STRUCTURE AND METHOD FOR MANUFACTURING SAME, DISPLAY SUBSTRATE, AND DISPLAY DEVICE", the disclosure of which is herein incorporated by reference in its entirety.

TECHNICAL FIELD

The present disclosure relates to the field of display technologies, and in particular, relates to a black matrix structure and a method for manufacturing the same, a display substrate, and a display device.

BACKGROUND

A color film substrate in a display device generally includes a base substrate, a black matrix (BM) structure composed of a plurality of BM strips that are intersected with each other and disposed on the base substrate, and a filter structure disposed in an opening region of the BM structure. The BM strips are configured to shade light to avoid mutual interference between light passing through different filter structures.

In the current BM structure, the width of the BM strip is larger (for example, the minimum width of the BM strip in the art is 2.5 microns), causing that the current BM structure is difficult to be applicable to display devices having higher resolution requirements, such as virtual reality (VR) devices.

SUMMARY

Embodiments of the present disclosure provide a black matrix structure and a method for manufacturing the same, a display substrate, and a display device. The technical solutions of the present disclosure are as follows.

In a first aspect, a black matrix structure is provided. The black matrix structure includes: a plurality of black matrix strips that are intersected with each other, wherein
  a width of the black matrix strip ranges from 2 to 2.5 microns, and a distance between any two adjacent black matrix strips in the plurality of black matrix strips ranges from 4 to 5 microns.

Optionally, a slope angle of the black matrix strips ranges from 80 to 85 degrees.

Optionally, a first section of the black matrix strip is in a chamfered isosceles trapezoid shape, and the first section is parallel to a width direction of the black matrix strip and perpendicular to a length direction of the black matrix strip.

Optionally, a vertex angle of the chamfered isosceles trapezoid is an arc-shaped chamfer, and the vertex angle of the chamfered isosceles trapezoid is an included angle between an upper base of the chamfered isosceles trapezoid and legs of the chamfered isosceles trapezoid.

Optionally, the vertex angle of the chamfered isosceles trapezoid ranges from 95 to 100 degrees.

In a second aspect, a display substrate is provided. The display substrate includes:
  a base substrate; and
  the black matrix structure as defined in the first aspect or any optional embodiments of the first aspect on the base substrate.

Optionally, the display substrate further includes: a color filter layer, wherein a filter structure of the color filter layer is disposed in an opening region of the black matrix structure.

Optionally, the display substrate further includes:
  a protective layer on a side, distal from the base substrate, of the color filter layer; and
  a spacer layer on a side, distal from the base substrate, of the protective layer, wherein the spacer layer includes a primary spacer and a secondary spacer, a height of the primary spacer being greater than a height of the secondary spacer.

In a third aspect, a display device is provided. The display device includes the display substrate as defined in the second aspect or any optional embodiments of the second aspect.

In a fourth aspect, a method for manufacturing a black matrix structure as defined in the rust aspect or any optional embodiments of the first aspect is provided. The method includes:
  forming an initial black matrix structure on a base substrate, the initial black matrix structure including a plurality of initial black matrix strips that are intersected with each other, wherein the plurality of initial black matrix strips are of an integral structure formed by stacking a first trapezoidal truncated cone, a cuboid, and a second trapezoidal truncated cone sequentially along a direction facing away from the base substrate, wherein an upper base face of the first trapezoidal truncated cone and an upper base face of the second trapezoidal truncated cone are in contact with two opposite faces of the cuboid respectively, an area of a lower base face of the second trapezoidal truncated cone is larger than an area of a lower base face of the first trapezoidal truncated cone, and a side face of the first trapezoidal truncated cone and a side face of the second trapezoidal truncated cone protrude from a side face of the cuboid respectively; and
  removing and partially collapsing a structure of the second trapezoidal truncated cone of the initial black matrix strips in the initial black matrix structure that protrudes from the cuboid, with a collapsed portion covering a structure of the first trapezoidal truncated cone that protrudes from the cuboid, so as to acquire final black matrix structure.

Optionally, removing and partially collapsing the structure of the second trapezoidal truncated cone of the initial black matrix strips in the initial black matrix structure that protrudes from the cuboid, with the collapsed portion covering the structure of the first trapezoidal truncated cone that protrudes from the cuboid with the collapsed portion include:
  heating the initial black matrix structure, and bombarding the initial black matrix structure with a plasma, so as to remove and partially collapse the structure of the second trapezoidal truncated cone of the initial black matrix strips in the initial black matrix structure that protrudes from the cuboid, with the collapsed portion covering the structure of the first trapezoidal truncated cone that protrudes from the cuboid.

Optionally, heating the initial black matrix structure and bombarding the initial black matrix structure with the plasma include: heating the initial black matrix structure from a side, distal from the black matrix structure, of the base substrate, and bombarding the initial black matrix structure with the plasma from a side, distal from the base substrate, of the initial black matrix structure.

Optionally, heating the initial black matrix structure and bombarding the initial black matrix structure with the plasma include: heating the initial black matrix structure with infrared rays, and bombarding the initial black matrix structure with a mixed plasma of a helium plasma and an argon plasma.

Optionally, a heating temperature of the initial black matrix structure is greater than or equal to 230 degrees Celsius, and a vacuum pressure of the plasma is less than 100 Pa.

Optionally, forming the initial black matrix structure on the base substrate includes:
  forming a black matrix film layer on the base substrate from a negative photoresist material;
  bonding the black matrix film layer to the base substrate by baking the black matrix film layer; and
  acquiring the initial black matrix structure by exposing and developing the black matrix film layer sequentially.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 3 is a schematic structural diagram of a display substrate according to an embodiment of the present disclosure:

FIG. 4 is a flow chart of a method for manufacturing a black matrix structure according to an embodiment of the present disclosure;

The drawings herein are incorporated into the description, constitute a part of the description, show embodiments conforming to the present disclosure, and are used to explain the principles of the present disclosure in conjunction with the description.

DETAILED DESCRIPTION

For clearer descriptions of the principles, technical solutions, and advantages of the present disclosure, the following describes the present disclosure in detail with reference to the accompanying drawings. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

A color film substrate in a display device generally includes a BM structure composed of a plurality of BM strips that are intersected with each other. The BM strips are configured to shade light to avoid light leakage of sub-pixels in the display device. It can be understood that the BM structure are prone to affecting the resolution of the display device. However, the width of the BM strip in the current BM structure is greater, and the minimum width of the BM strip in the art is 2.5 microns, causing that the resolution of the display device is only 1200 pixels per inch (PPI) at most, such that the BM structure is difficult to be applicable to display devices having higher resolution requirements, such as virtual reality (VR) devices (for example, it is difficult to be applicable to display devices having resolution requirements greater than 1200 PPI).

In view of this, the embodiments of the present disclosure provide a black matrix structure and a method for manufacturing the same, a display substrate, and a display device. In the black matrix structure according to the embodiments of the present disclosure, the width of a black matrix strip is less, which breaks the width limit (2.5 microns) of the BM strips in the related art, and the distance between two adjacent black matrix strips is smaller. Therefore, the black matrix structure may be applicable to the display devices having higher resolution requirements, such as VR devices (for example, it may be applicable to the display devices having resolution requirements greater than 1200 PPI). The technical solutions in the embodiments of the present disclosure are described below in detail in connection with the accompany drawings.

Figure 1:
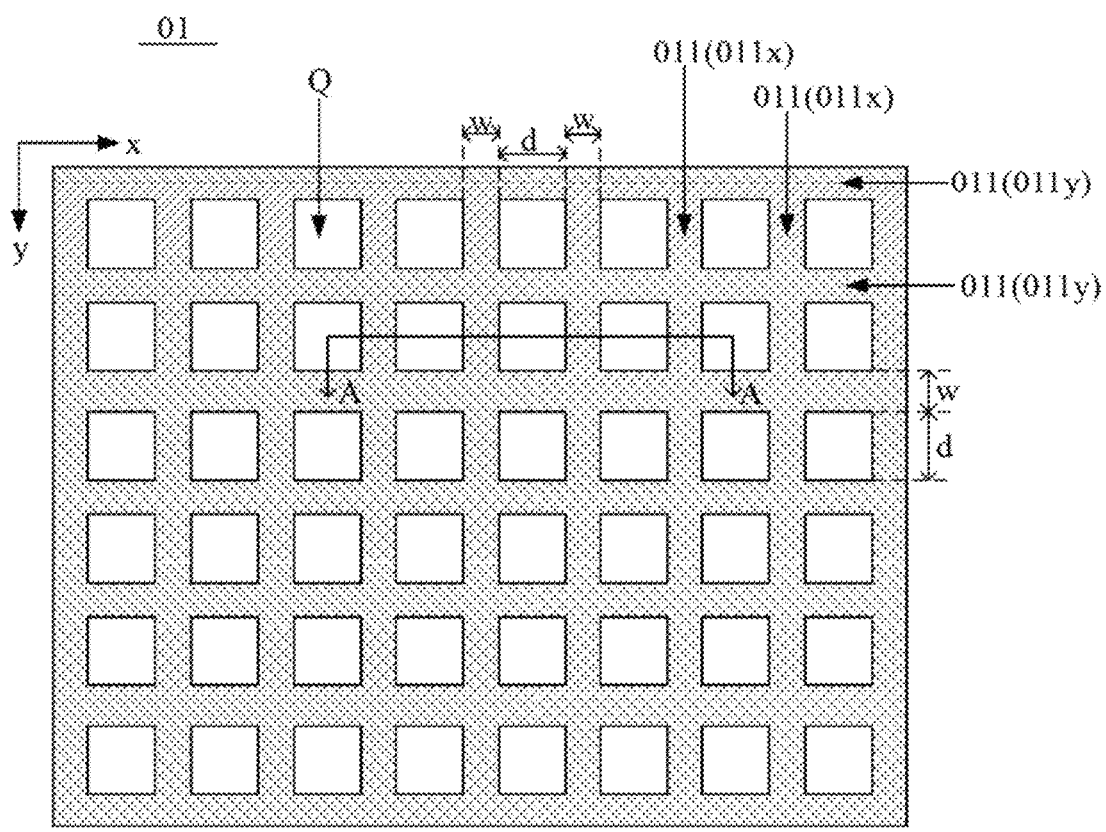
FIG. 1 is a front view of a black matrix structure according to an embodiment of the present disclosure.
Figure 2:
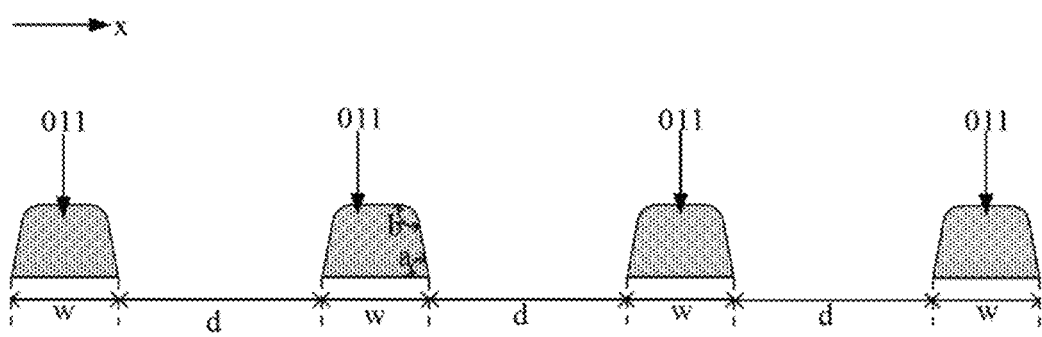
FIG. 2 is a sectional view of an A-A plane of the black matrix structure shown in FIG. 1.

Referring to FIGS. 1 and 2, FIG. 1 is a front view of a black matrix structure 01 according to an embodiment of the present disclosure, and FIG. 2 is a sectional view of an A-A plane of the black matrix structure 01 shown in FIG. 1. Referring to FIGS. 1 and 2, the black matrix structure 01 includes a plurality of black matrix strips 011 that are intersected with each other, the width w of the black matrix strip 011 ranges from of 2 to 2.5 microns, and the distance d between any two adjacent black matrix strips 011 of the plurality of black matrix strips 011 ranges from 4 to 5 microns. In an exemplary embodiment, the width w of the black matrix strip 011 is 2 microns, 2.1 microns, 2.3 microns, or the like, and the distance d between the any two adjacent black matrix strips 011 is 4 microns, 4.1 microns, 4.3 microns, or the like, which are not limited in the embodiments of the present disclosure.

Optionally, the black matrix structure 01 is of a mesh structure composed of the plurality of black matrix strips 011 that are intersected with each other, and a region defined by the plurality of black matrix strips 011 in an intersection fashion is an opening region of the black matrix structure 01. Optionally, the plurality of black matrix strips 011 are intersected with longitudinally and transversely, and length directions of the plurality of black matrix strips 011 that are intersected with each other are perpendicular to each other. Illustratively, as shown in FIG. 1, the plurality of black matrix strips 011 include the black matrix strips 011 arranged along a first direction x and the black matrix strips 011 arranged along a second direction y (for the sake of distinction, the black matrix strips 0111 arranged along the first direction x are denoted as black matrix strips 011x, and the black matrix strips 011 arranged along the second direction y are denoted as black matrix strips 011y; and it may be understood that the black matrix strips 011x and the black matrix strips 011y are of the same structure, and are only different in arrangement directions). The first direction x is perpendicular to the second direction y. A width direction of each of the black matrix strips 011x arranged along the first direction x is parallel to the first direction x, and a length direction of each of the black matrix strips 011x arranged along the first direction x is parallel to the second direction y. A width direction of each of the black matrix strips 011y arranged along the second direction y is parallel to the second direction y, and a length direction of each of the black matrix strips 011y arranged along the second direction y is parallel to the first direction x. A region defined by the black matrix strips 011x arranged along the first direction x and the black matrix strips 0111y arranged along the second direction y in the intersection fashion is an opening region Q of the black matrix structure 01.

Optionally, in the embodiments of the present disclosure, the width w of the black matrix strip 011 may be referred to the maximum width of the black matrix strip 011, and the distance d between any two adjacent black matrix strips 011 may be referred to the minimum distance between the two adjacent black matrix strips 011. Illustratively, as shown in FIG. 2, a first section of the black matrix strips 011 is in a chamfered isosceles trapezoid shape, the width w of the black matrix strips 011 may be referred to the width of a lower base of the chamfered isosceles trapezoid, and the distance d between two adjacent black matrix strips 011 may be referred to the distance between the lower bases of the chamfered isosceles trapezoids of the first sections of the two adjacent black matrix strips 011. The first section of each of the black matrix strip 011 is parallel to the width direction of the black matrix strip 011 and perpendicular to the length direction of the black matrix strip. Illustratively, the first section of the black matrix strip 011x is parallel to the first direction x and perpendicular to the second direction y, and the first section of the black matrix strip 011y is parallel to the second direction y and perpendicular to the first direction x.

Optionally, a slope angle a of the black matrix strip 011 ranges from 80 to 85 degrees. Illustratively, the slope angle of the black matrix strip 011 is 80 degrees, 82 degrees, 83 degrees, 85 degrees, or the like. The first section of the black matrix strip 011 is in the chamfered isosceles trapezoid shape, the slope angle a of the black matrix strip 011 may be a base angle of the chamfered isosceles trapezoid, and the base angle of the chamfered isosceles trapezoid is an included angle between a lower base of the chamfered isosceles trapezoid and legs of the chamfered isosceles trapezoid. The slope angle of the black matrix strip is generally around 70 degrees in the related art, and the less slope angle of the black matrix strip easily results in a greater width of the black matrix strip. In the embodiments of the present disclosure, as the slope angle of the black matrix strip 011 ranges from 80 to 85 degrees, the slope angle of the black matrix strip 011 is smaller, which is conducive to reducing the width of the black matrix strip 011, thereby improving the resolution of the display devices. Optionally, a vertex angle b of the chamfered isosceles trapezoid is an arc-shaped chamfer, the vertex angle b of the chamfered isosceles trapezoid is an included angle between an upper base of the chamfered isosceles trapezoid and the legs of the chamfered isosceles trapezoid, and the vertex angle b (namely, the arc-shaped chamfer) of the chamfered isosceles trapezoid ranges from 95 to 100 degrees (for example, the vertex angle b of the chamfered isosceles trapezoid is 95 degrees, 98 degrees, 10 degrees, or the like). It is easily understood by persons skilled in the art that the arc-shaped chamfer and the slope angle a of the black matrix strip 011 may be complementary, and a sum of the two may be equal to 180 degrees, which is not limited in the embodiments of the present disclosure.

In summary, for the black matrix structure according to the embodiments of the present disclosure, as the width of the black matrix strip is less and the distance between any two adjacent black matrix strips is smaller, the black matrix structure may be applicable to the display devices having higher resolution requirements, such as VR devices, especially applicable to display devices having ultra-high resolution requirements. With the technical solution provided in the embodiments of the present disclosure, the black matrix strips can be fined to allow the resolution of the display devices to reach 1000 ppi to 1500 ppi.

Based on the same inventive concepts, an embodiment of the present disclosure provides a display substrate. The display substrate may include the black matrix structure 01 according to the embodiments described above.

Illustratively, referring to FIG. 3, FIG. 3 shows a schematic structural diagram of a display substrate according to an embodiment of the present disclosure. As shown in FIG. 3, the display substrate includes a base substrate 02 and a black matrix structure 01 on the base substrate 02. For the specific structure of the black matrix structure 01, reference may be made to the foregoing embodiments and FIGS. 1 and 2, which are not repeated herein in the embodiments of the present disclosure.

Optionally, as shown in FIG. 3, the display substrate further includes a color filter layer 03. The color filter layer 03 is a color filter pattern composed of a plurality of filter structures arranged in an array, and each of the filter structures is disposed in one opening region Q of the black matrix structure 01. Illustratively, the color filter layer 03 includes a red filter structure 031, a green filter structure 032, and a blue filter structure 033. The red filter structure 031 is configured to filter light other than red light from incident light and allow the red light to transmit, the green filter structure 032 is configured to filter light other than green light from the incident light and allow the green light to transmit, and the blue filter structure 033 is configured to filter light other than blue light from the incident light and allow the blue light to transmit.

Optionally, as shown in FIG. 3, the display substrate further includes a protective layer 04 on a side, distal from the base substrate 02, of the color filter layer 03. The protective layer 04 is configured to protect the color filter layer 03 and the black matrix structure 01. The protective layer 04 may also be referred to as an over cover (OC) layer.

Optionally, as shown in FIG. 3, the display substrate further includes a spacer layer on a side, distal from the base substrate 02, of the protective layer 04. The spacer layer includes a primary spacer 051 and a secondary spacer 052. A height of the primary spacer 051 is greater than a height of the secondary spacer 052. The height of each photo spacer of the primary spacer 051 and the secondary spacer 052 is the distance between a face, distal from the protective layer 04, of the photo spacer and a face, proximal to the protective layer 04, of the photo spacer. Both the primary spacer 051 and the secondary spacer 052 may be of a truncated cone-shaped structure. Both the shape of a longitudinal section of the primary spacer 051 and the shape of a longitudinal section of the secondary spacer 052 may be trapezoid. The longitudinal section of the primary spacer 051 and the longitudinal section of the secondary spacer 052 are perpendicular to a plate face of the base substrate 02. Optionally, both the primary spacer 051 and the secondary spacer 052 are of a circular truncated cone-shaped structure, or both the primary spacer 051 and the secondary spacer 052 are of a truncated pyramid-shaped structure, which is not limited in the embodiments of the present disclosure.

Optionally, the display substrate may be a color film substrate. The spacer layer is configured to support an array substrate upon the display substrate is mated with the array substrate, so as to form a space for accommodating liquid crystals between the display substrate and the array substrate. The spacer layer may improve the uniformity of the overall thickness of a display device formed by mating the display substrate with the array substrate. The height of the primary spacer 051 is greater than the height of the secondary spacer 052, such that a height difference exists between the primary spacer 051 and the secondary spacer 052, and the thickness of the display device may be slightly adjusted by adjusting the height difference between the primary spacer 051 and the secondary spacer 052, it is easily understood by persons skilled in the art that in the case that the display device is subjected to an external pressure, the primary spacer 051 bears all pressure and is compressed first, and in the case that the primary spacer 051 is compressed until the height difference between the primary spacer 051 and the secondary spacer 052 is 0, the primary spacer 051 and the secondary spacer 052 bear the external pressure simultaneously.

It is easily understood by persons skilled in the art that the structure of the display substrate shown in FIG. 3 is merely exemplary, and in practice, the display substrate may include more or less structures than those in FIG. 3 (for example, the display substrate may further include structures such as an alignment layer and a common electrode; and for another example, the display substrate may not include the protective layer 04), which is not limited in the embodiments of the present disclosure.

In summary, for the display substrate according to the embodiments of the present disclosure, as the width of the black matrix strip is less and the distance between any two adjacent black matrix strips is smaller, the display substrate may be applicable to the display devices having higher resolution requirements, such as VR devices, especially applicable to the display devices having ultra-high PPI requirements. With the technical solution provided in the embodiments of the present disclosure, the black matrix strips can be fined to allow the resolution of the display devices to reach 1000 ppi to 1500 ppi.

The black matrix structure and the display substrate according to the embodiments of the present disclosure may be applicable to the method hereinafter. For methods and principles for manufacturing the black matrix structure and a display substrate according to the embodiments of the present disclosure, reference may be made to descriptions in various embodiments hereinafter.

Referring to FIG. 4, FIG. 4 shows a flow chart of a method for manufacturing a black matrix structure according to an embodiment of the present disclosure. The method for manufacturing the black matrix structure may be used for manufacturing the black matrix structure 01 as shown in FIGS. 1 and 2. Referring to FIG. 4, the method may include the following processes.

In S401, an initial black matrix structure is formed on a base substrate, wherein the initial black matrix structure includes a plurality of initial black matrix strips that are intersected with each other, wherein the plurality of initial black matrix strips are of an integral structure formed by stacking a first trapezoidal truncated cone, a cuboid, and a second trapezoidal truncated cone sequentially along a direction facing away from the base substrate, wherein an upper base face of the first trapezoidal truncated cone and an upper base face of the second trapezoidal truncated cone are in contact with two opposite faces of the cuboid respectively, an area of a lower base face of the second trapezoidal truncated cone is larger than an area of a lower base face of the first trapezoidal truncated cone, and a side face of the first trapezoidal truncated cone and a side face of the second trapezoidal truncated cone protrude from a side face of the cuboid respectively.

In S402, a structure of the second trapezoidal truncated cone of the initial black matrix strips in the initial black matrix structure that protrudes from the cuboid is removed and partially collapsed, with a collapsed portion covering a structure of the first trapezoidal truncated cone that protrudes from the cuboid, so as to acquire a final black matrix structure.

The final black matrix structure includes a plurality of black matrix strips that are intersected with each other. The width of the black matrix strip ranges from 2 to 2.5 microns, and the distance between any two adjacent black matrix strips ranges from 4 to 5 microns.

In summary, in the method for manufacturing a black matrix structure according to the embodiments of the present disclosure, an initial black matrix structure is formed on a base substrate first. Then, a structure of a second trapezoidal truncated cone of an initial black matrix strip in the initial black matrix structure that protrudes from a cuboid of the initial black matrix strip is removed and partially collapsed, and a collapsed portion covers a structure of a first trapezoidal truncated cone of the initial black matrix strip that protrudes from the cuboid, so as to acquire a final black matrix structure. Due to the partial removal of the structure of the second trapezoidal truncated cone of the initial black matrix strip that protrudes from the cuboid of the initial black matrix strip, a smaller portion of the second trapezoidal truncated cone is collapsed and covers the first trapezoidal truncated cone, which is conducive to reducing the width of black matrix strips in the finally formed black matrix structure, such that the black matrix structure may be applicable to the display devices having higher resolution requirements, such as VR devices.

Figure 5:
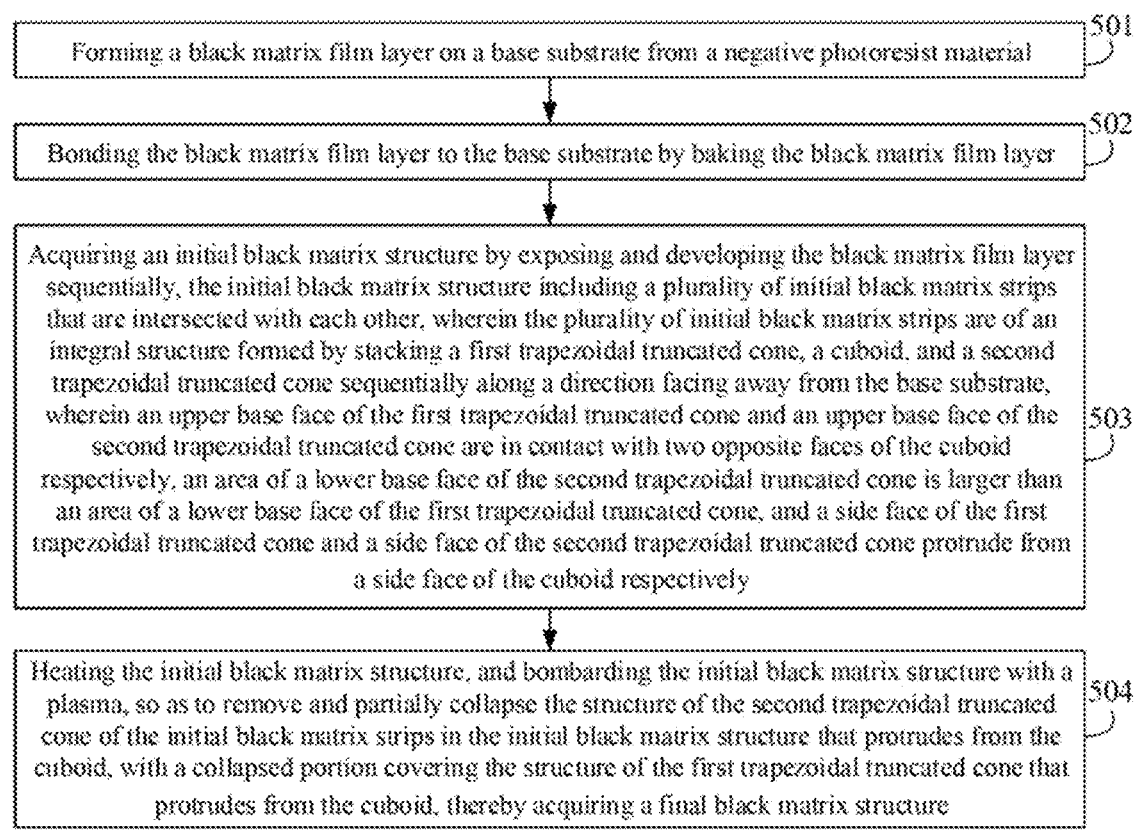
FIG. 5 is a flow chart of another method for manufacturing a black matrix structure according to an embodiment of the present disclosure.

Referring to FIG. 5, FIG. 5 shows a flow chart of another method for manufacturing a black matrix structure according to an embodiment of the present disclosure. The method for manufacturing a black matrix structure may be used for manufacturing the black matrix structure 01 as shown in FIGS. 1 and 2. Referring to FIG. 5, the method may include the following steps.

In S501, a black matrix film layer is formed on a base substrate from a negative photoresist material.

Figure 6:
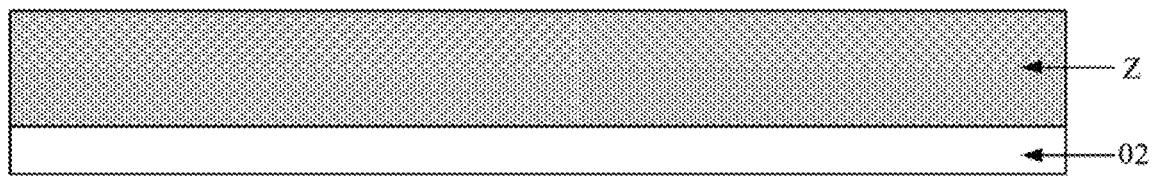
FIG. 6 is a schematic diagram after a black matrix film layer is formed on a base substrate according to an embodiment of the present disclosure.

In an exemplary embodiment, referring to FIG. 6, it shows a schematic diagram after a black matrix film layer Z is formed on a base substrate 02 according to an embodiment of the present disclosure. The black matrix film layer Z covers the base substrate 02. Optionally, a layer of black negative photoresist material may be coated onto the base substrate 02 as the black matrix film layer Z.

In S502, the black matrix film layer is bonded to the base substrate by baking the black matrix film layer.

Optionally, a prebaking process may be used to bake the black matrix film layer from a side, distal from the black matrix film layer, of the base substrate, so as to cure a portion of the black matrix film layer that is in contact with the base substrate, such that the black matrix film layer is bonded to the base substrate. Illustratively, the black matrix film layer Z is baked from the side, distal from the black matrix film layer Z, of the base substrate 02 to cure the portion of the black matrix film layer Z that is in contact with the base substrate 02, such that the black matrix film layer Z is bonded to the base substrate 02.

In S503, an initial black matrix structure is acquired by exposing and developing the black matrix film layer sequentially, the initial black matrix structure including a plurality of initial black matrix strips that are intersected with each other, wherein the plurality of initial black matrix strips are of an integral structure formed by stacking a first trapezoidal truncated cone, a cuboid, and a second trapezoidal truncated cone sequentially along a direction facing away from the base substrate, wherein an upper base face of the first trapezoidal truncated cone and an upper base face of the second trapezoidal truncated cone are in contact with two opposite faces of the cuboid respectively, an area of a lower base face of the second trapezoidal truncated cone is larger than an area of a lower base face of the first trapezoidal truncated cone, and a side face of the first trapezoidal truncated cone and a side face of the second trapezoidal truncated cone protrude from a side face of the cuboid respectively.

Figure 7:
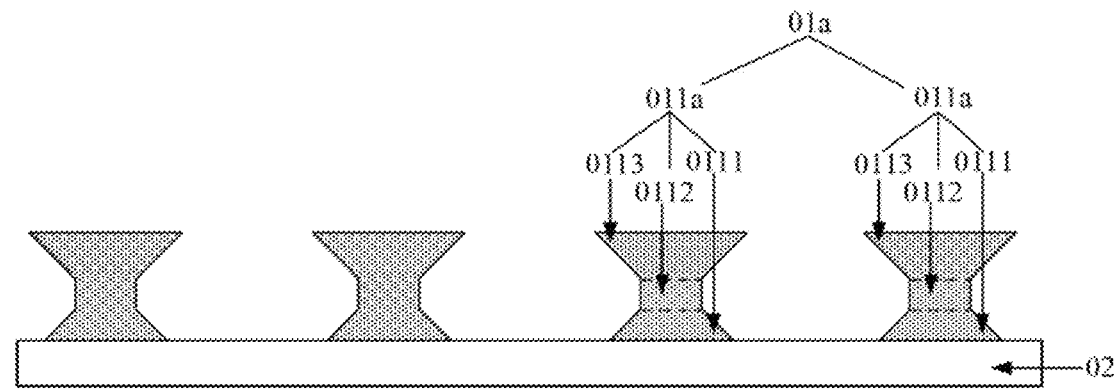
FIG. 7 is a schematic diagram after the black matrix film layer is exposed and developed successively according to an embodiment of the present disclosure.

Illustratively, referring to FIG. 7, FIG. 7 shows a schematic diagram after the black matrix film layer Z is exposed and developed sequentially according to an embodiment of the present disclosure. As shown in FIG. 7, an initial black matrix structure 01a is acquired by exposing and developing the black matrix film layer Z sequentially. The initial black matrix structure 01a includes a plurality of initial black matrix strips 011a that are intersected with each other (a front view of the initial black matrix structure 01a is similar to FIG. 1, and their difference only lies in the width of the black matrix strip and the distance between any two adjacent black matrix strips). Each initial black matrix strip 011a in the plurality of initial black matrix strips 011a is of an integral structure formed by stacking a first trapezoidal truncated cone 0111, a cuboid 0112, and a second trapezoidal truncated cone 0113 sequentially along a direction facing away from the base substrate 02. An upper base face of the first trapezoidal truncated cone 0111 and an upper base face of the second trapezoidal truncated cone 0113 are in contact with two opposite faces of the cuboid 0112 respectively. An area of a lower base face of the second trapezoidal truncated cone 0113 is larger than an area of a lower base face of the first trapezoidal truncated cone 0111. A side face of the first trapezoidal truncated cone 0111 and a side face of the second trapezoidal truncated cone 0113 protrude from a side face of the cuboid 0112 respectively. In the embodiments of the present disclosure, the trapezoidal truncated cone is referred to a truncated cone-shaped structure with a longitudinal section of a trapezoid shape; the longitudinal section of the trapezoidal truncated cone is parallel to a height direction of the trapezoidal truncated cone; the trapezoidal truncated cone includes two base faces that are parallel to each other but not equal in area; the base face of the two base faces with a smaller area is the upper base face of the trapezoidal truncated cone, and the base face with a larger area is the lower base face of the trapezoidal truncated cone; the distance between the two base faces is the height of the trapezoidal truncated cone; the side face of the trapezoidal truncated cone is referred to a face other than the two base faces among faces of the trapezoidal truncated cone; and the side face of the cuboid 0112 is referred to a face that is not in contact with the first trapezoidal truncated cone 0111 and the second trapezoidal truncated cone 0113 among faces of the cuboid 0112. Illustratively, the shape of a first section of the initial black matrix strips 011a is a pattern formed by superposing a first trapezoidal truncated cone, a cuboid, and a second trapezoidal truncated cone sequentially along the direction facing away from the base substrate 02. The first trapezoidal truncated cone is also the shape of a first section of the first trapezoidal truncated cone 0111, the cuboid is also the shape of a first section of the cuboid 0112, the second trapezoidal truncated cone is also the shape of a first section of the second trapezoidal truncated cone 0113, and the first section is parallel to a width direction of the initial black matrix strip 011a and perpendicular to a length direction of the initial black matrix strip 011a.

Optionally, a mask plate is used to expose the black matrix film layer Z first to allow the black matrix film layer Z to form a fully exposed region and an unexposed region, and in the exposure process, the fully exposed region of the black matrix film layer Z is cured; and then, the exposed black matrix film layer Z is developed to allow the unexposed region of the black matrix film layer Z is removed and the fully exposed region is retained, thereby acquiring the initial black matrix structure 01a. Illustratively, during exposure, the mask plate is disposed on a side, distal from the base substrate 02, of the black matrix film layer Z. Then, a light source is disposed on a side, distal from the black matrix film layer Z, of the mask plate, and the light source is configured to illuminate the black matrix film layer Z through the mask plate, such that a portion of the black matrix film layer Z corresponding to an opening region of the mask plate is photosensitive to form the fully exposed region, and a portion corresponding to a light shielding region (namely, an area other than the opening region on the mask plate) of the mask plate is allowed to be the unexposed region. When developing the exposed black matrix film layer Z, the base substrate 02 including the exposed black matrix film layer Z is placed into a developer to allow a reaction between the developer and the unexposed region of the black matrix film layer Z, thereby removing the unexposed region of the black matrix film layer Z.

It is easily understood by persons skilled in the art that when exposing the black matrix film layer Z, exposure degrees in the black matrix film layer Z decrease gradually along a direction proximal to the base substrate 02. That is, a portion of the black matrix film layer Z that is furthest from the base substrate 02 has the maximum exposure degree, a portion that is in contact with the base substrate 02 has the minimum exposure degree, and the exposure degree of a middle portion is less than the exposure degree of the portion furthest from the base substrate 02 and greater than the exposure degree of the portion in contact with the base substrate 02. As the portion of the black matrix film layer Z that is in contact with the base substrate 02 has been cured when the black matrix film layer Z is baked in the S502, after the exposure of the S503, in the black matrix film layer Z, the portion furthest from the base substrate 02 and the portion in contact with the base substrate 02 have greater curing degrees, and the middle portion has a less curing degree. Therefore, the initial black matrix structure 01*a* as shown in FIG. 7 is acquired after the development.

In S504, the initial black matrix structure is heated, and the initial black matrix structure is bombarded with a plasma, so as to remove and partially collapse the structure of the second trapezoidal truncated cone of the initial black matrix strips in the initial black matrix structure that protrudes from the cuboid, with a collapsed portion covering the structure of the first trapezoidal truncated cone that protrudes from the cuboid, thereby acquiring a final black matrix structure.

Optionally, the initial black matrix structure may be heated from a side, distal from the black matrix structure, of the base substrate, and be bombarded with a plasma from a side, distal from the base substrate, of the initial black matrix structure. Optionally, the initial black matrix structure is heated with infrared rays from the side, distal from the black matrix structure, of the base substrate, and is bombarded with a mixed plasma of a helium plasma and an argon plasma from the side, distal from the base substrate, of the initial black matrix structure. The heating temperature of the initial black matrix structure is greater than or equal to 230 degrees Celsius, and the vacuum pressure of the plasma is less than 100 Pa.

Figure 8:
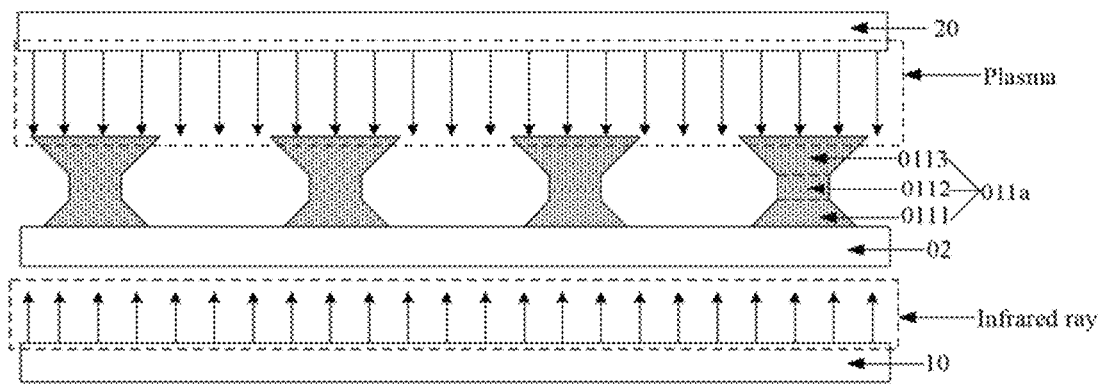
FIG. 8 is a schematic diagram of treatment of an initial black matrix structure according to an embodiment of the present disclosure.
Figure 9:
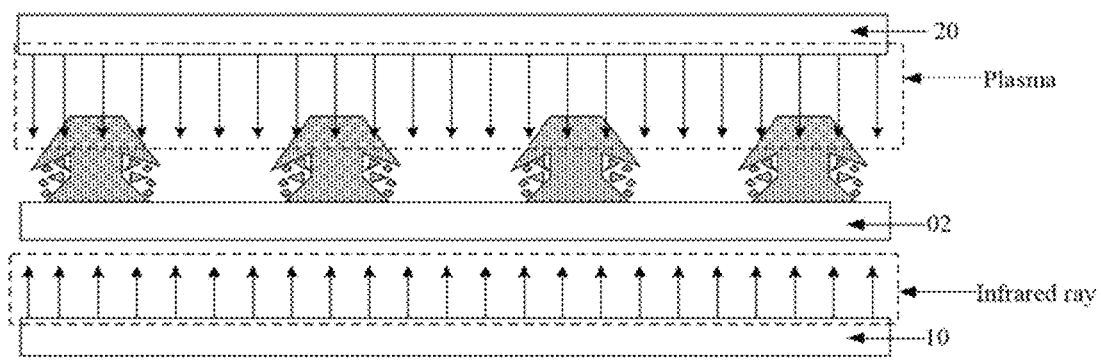
FIG. 9 is a schematic diagram of another treatment of an initial black matrix structure according to an embodiment of the present disclosure.
Figure 10:
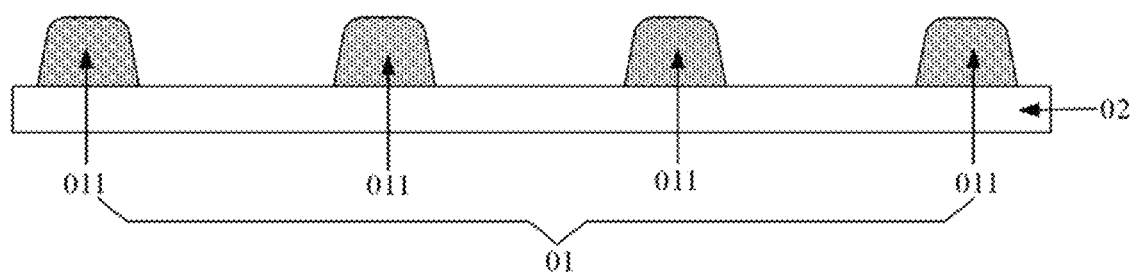
FIG. 10 is a schematic diagram after a black matrix structure is formed on a base substrate according to an embodiment of the present disclosure.

Illustratively, referring to FIGS. 8 and 9, FIGS. 8 and 9 show schematic diagrams of heating an initial black matrix structure 01*a* and bombarding the initial black matrix structure 01 with plasma according to an embodiment of the present disclosure. As shown in FIG. 8, first, an infrared light source 10, a plasma source 20, and a base substrate 02 including the initial black matrix structure 01*a* are disposed within a sealed cavity (not shown in FIG. 8), such that the infrared light source 10 is disposed below the base substrate 02 (namely, a side, distal from the initial black matrix structure 01*a*, of the base substrate 02), and the plasma source 20 is disposed above the initial black matrix structure 01*a* (namely, a side, distal from the base substrate 02, of the black matrix structure 01*a*). Then, the infrared light source 10 emits the infrared rays to the base substrate 02 to allow the infrared rays emitted from the infrared light source 10 to heat the initial black matrix structure 01*a* through the base substrate 02, and the heating temperature of the black matrix structure 01*a* by the infrared light source 10 is controlled to be greater than 230 degrees Celsius. Eventually, the plasma source 20 emits the plasma to the initial black matrix structure 01*a* to bombard the initial black matrix structure 01*a*. As shown in FIG. 9, in the process of heating the initial black matrix structure 01*a* and bombarding the initial black matrix structure 01*a* with the plasma, a structure of the second trapezoidal truncated cone 0113 of the initial black matrix strips 011*a* that protrudes from the cuboid 0112 is removed by bombarding with the plasma and partially collapsed under the action of infrared heating, and a structure of the first trapezoidal truncated cone 0111 of the initial black matrix strips 011*a* that protrudes from the cuboid 012 is covered with a collapsed portion of the second trapezoidal truncated cone 0113, so as to acquire a final black matrix structure as shown in FIG. 10. FIG. 10 is a schematic diagram after a black matrix structure 01 is formed on a base substrate 02 according to an embodiment of the present disclosure. The black matrix structure 01 includes a plurality of black matrix strips 011 that are intersected with each other, the width of the black matrix strip 011 ranges from 2 to 2.5 microns, and the distance between any two adjacent black matrix strips of the plurality of black matrix strips ranges from 4 to 5 microns. Optionally, when the plasma source 20 emits the plasma to the initial black matrix structure 01*a*, an electric field may further be applied to the plasma to control an emitting direction of the plasma, such that the plasma can bombard the initial black matrix structure 01*a* more effectively. Illustratively, high frequency alternating currents may be applied on a side, distal from the initial black matrix structure 011*a*, of the plasma source 20, and low frequency alternating currents may be applied on a side, distal from the initial black matrix structure 01*a*, of the base substrate 02. Under the action of the high frequency alternating currents and the low frequency alternating currents, the electric field is formed around the initial black matrix structure 01*a*, so as to apply the electric field to the plasma emitted from the plasma source 20.

The inventors have found through experiments that the width of the black matrix strips in the final black matrix structure is positively correlated with a bombarding duration of the plasma to the initial black matrix structure. Therefore, in the embodiments of the present disclosure, the width of the black matrix strips 011 may be controlled by controlling the bombarding duration of the plasma to the initial black matrix structure 01*a*. Illustratively, data acquired by a plasma bombarding experiment performed by the inventors on the initial black matrix structure with the thickness of 1.05 microns (the thickness of the initial black matrix structure is referred to the distance between a face, distal from the base substrate, of the initial black matrix structure and a face, proximal to the base substrate, of the initial black matrix structure) is shown in Table 1 below. Decrement in one-side width is referred to a decrement in the width of a side of the initial black matrix strip, and decrement in overall width is referred to a sum of decrements in the width of both sides of the initial black matrix strip.

TABLE 1

| Bombarding duration (unit: second) | 0 | 10 | 15 | 20 | 30 | 40 |
|---|---|---|---|---|---|---|
| Decrement in one-side width (unit: micron) | 0 | 0.014 | 0.022 | 0.042 | 0.063 | 0.076 |
| Decrement in overall width (unit: micron) | 0 | 0.028 | 0.044 | 0.084 | 0.126 | 0.152 |

It can be seen from Table 1 that the decrement in the width of the initial black matrix strips is positively correlated with the bombarding duration of the plasma to the initial black matrix structure, and when the initial black matrix structure is bombarded with the plasma, the decrements in the width of both sides of the initial black matrix strips are equal.

In the current process of manufacturing a black matrix structure, an oven process (a high temperature process) is generally used for an initial black matrix structure upon the initial black matrix structure is acquired, so as to allow a structure of a second trapezoidal truncated cone of an initial black matrix strip that protrudes from a cuboid is collapsed on a base substrate entirely, causing a greater width of a black matrix strip of the eventually manufactured black matrix structure, and the minimum width of the black matrix strips in the related art is 2.5 microns. In the method for manufacturing a black matrix structure according to the embodiments of the present disclosure, by heating an initial black matrix structure and bombarding the initial black matrix structure with the plasma, a structure of a second trapezoidal truncated cone of an initial black matrix strip in the initial black matrix structure that protrudes from a cuboid is removed and partially collapsed, the width of a black matrix strip of the manufactured black matrix structure is less, and the width of the black matrix strip ranges from 2 to 2.5 microns, which is smaller than the width of the black matrix strips in the related art. Therefore, the method for manufacturing a black matrix structure according to the embodiments of the present disclosure can improve the resolution of the display devices and can be applicable to the display devices having higher resolution requirements, such as VR devices.

In summary, in the method for manufacturing a black matrix structure according to the embodiments of the present disclosure, an initial black matrix structure is formed on a base substrate first. Then, by performing heating and plasma bombarding on the initial black matrix structure, a structure of a second trapezoidal truncated cone of an initial black matrix strip in the initial black matrix structure that protrudes from a cuboid of the initial black matrix strip is removed and partially collapsed, and a collapsed portion covers a structure of a first trapezoidal truncated cone of the initial black matrix strip that protrudes from the cuboid, so as to acquire a final black matrix structure. Due to the partial removal of the structure of the second trapezoidal truncated cone of the initial black matrix strip that protrudes from the cuboid of the initial black matrix strip, a smaller portion of the second trapezoidal truncated cone is collapsed and covers the first trapezoidal truncated cone, which is conducive to reducing the width of black matrix strips in the finally formed black matrix structure, such that the black matrix structure may be applicable to the display devices having higher resolution requirements, such as VR devices.

Figure 11:
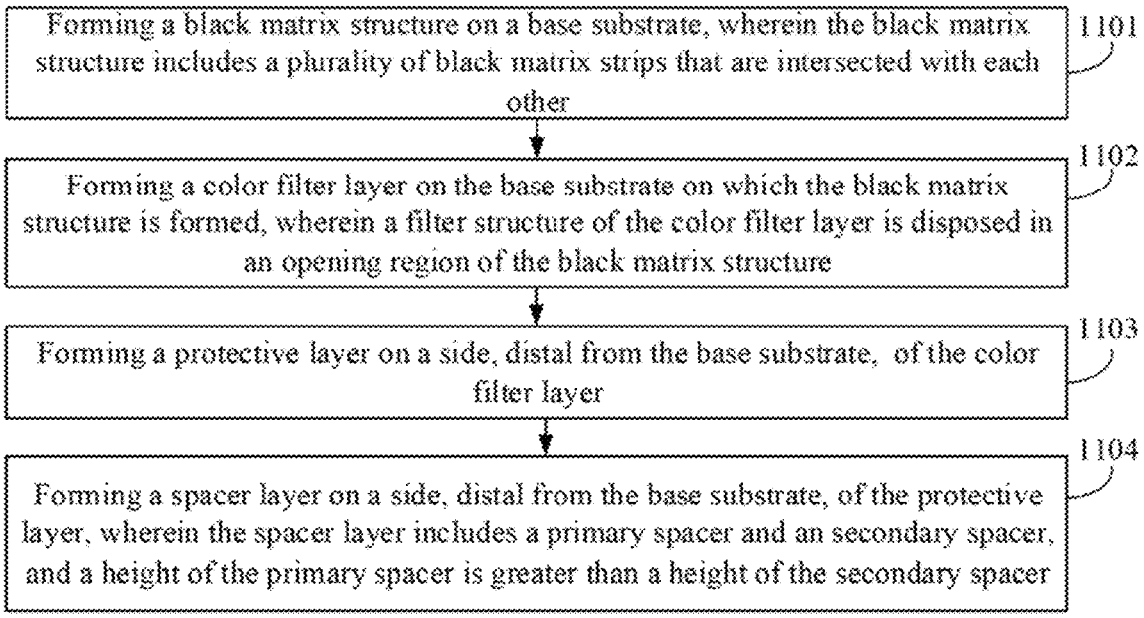
FIG. 11 is a method flow chart of a method for manufacturing a display substrate according to an embodiment of the present disclosure.

Referring to FIG. 11, FIG. 11 shows a flow chart of a method for manufacturing a display substrate according to an embodiment of the present disclosure. The method for manufacturing a display substrate may be used for manufacturing the display substrate as shown in FIG. 3. Referring to FIG. 11, the method may include the following processes.

In S1101, a black matrix structure is formed on a base substrate, wherein the black matrix structure includes a plurality of black matrix strips that are intersected with each other.

For the process of forming the black matrix structure on the base substrate, reference may be made to the embodiments shown in FIGS. 4 and 5. A schematic diagram after a black matrix structure is formed on a base substrate is shown in FIG. 10, which are not repeated herein in the embodiments of the present disclosure.

In S1102, a color filter layer is formed on the base substrate on which the black matrix structure is formed, wherein a filter structure of the color filter layer is disposed in an opening region of the black matrix structure.

Figure 12:
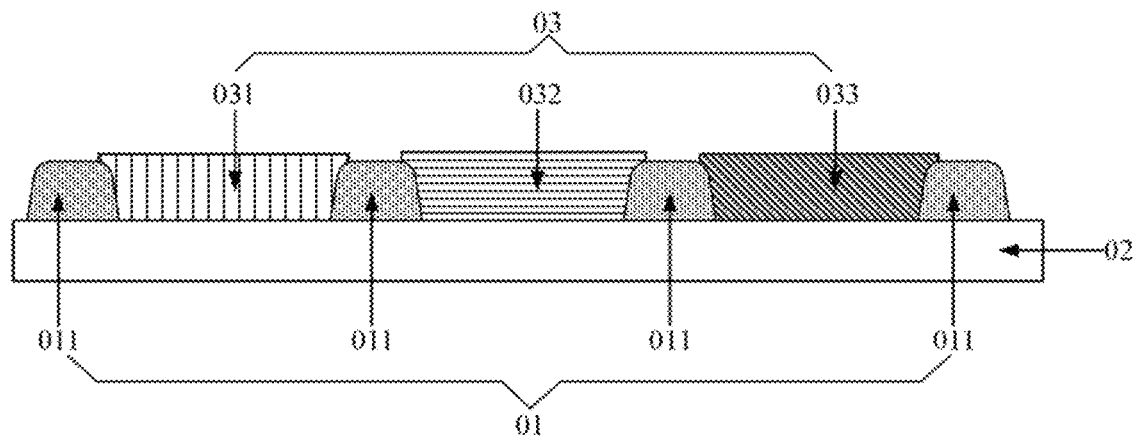
FIG. 12 is a schematic diagram after a color filter layer is formed on a base substrate on which a black matrix structure is formed according to an embodiment of the present disclosure.

Referring to FIG. 12, FIG. 12 shows a schematic diagram after a color filter layer 03 is formed on a base substrate 02 on which a black matrix structure 01 is formed according to an embodiment of the present disclosure. The color filter layer 03 includes a red filter structure 031, a green filter structure 032, and a blue filter structure 033. The red filter structure 031, the green filter structure 032, and the blue filter structure 033 are disposed in different opening regions of the black matrix structure 01. Optionally, a material of the red filter structure 031 may be a red resin material, a material of the green filter structure 032 may be a green resin material, and a material of the blue filter structure 033 may be a blue resin material. Illustratively, forming the color filter layer 03 on the base substrate 02 on which the black matrix structure 01 is formed includes: acquiring a red resin material layer by coating a layer of the red resin material onto the base substrate 02 on which the black matrix structure 01 is formed, and acquiring the red filter structure 031 by treating the red resin material layer via a one patterning process; acquiring a green resin material layer by coating a layer of the green resin material onto the base substrate 02 on which the red filter structure 031 is formed, and acquiring the green filter structure 032 by treating the green resin material layer via the one patterning process; and acquiring a blue resin material layer by coating a layer of blue resin materials onto the base substrate 02 on which the green filter structure 032 is formed, and acquiring the blue filter structure 033 by treating the blue resin material layer via the one patterning process. As such, the color filter layer 03 is acquired.

The one patterning process may include photoresist coating, exposing, developing, etching, and photoresist stripping. Therefore, treating the material layer (for example, the red resin material layer) via the one patterning process includes: coating a layer of photoresist onto the material layer (for example, the red resin material layer); exposing the photoresist with a mask plate to allow the photoresist to form a fully exposed region and an unexposed region: treating with a developing process to allow the photoresist in the fully exposed region to be removed and the photoresist in the unexposed region to be retained; etching an region on the material layer (for example, the red resin material layer) corresponding to the fully exposed region; and eventually, stripping away the photoresist in the unexposed region to acquire a corresponding structure (for example, the red filter structure 031). It is easily understood by persons skilled in the art that positive photoresist is taken as an example here to describe the one patterning process, the photoresist used in the one patterning process may also be negative photoresist, which are not repeated in the embodiments of the present disclosure.

It is easily understood by persons skilled in the art that the process of forming the filter structures of different colors in the color filter layer 03 may be adjusted. For example, it is possible that the red filter structure 031 is formed first, the green filter structure 032 is formed next, and the blue filter structure 033 is formed eventually; it is also possible that the green filter structure 032 is formed first, the red filter structure 031 is formed next, and the blue filter structure 033 is formed eventually; or it is also possible that the blue filter structure 033 is formed first, the red filter structure 031 is formed next, and the green filter structure 032 is formed eventually, which is not limited in the embodiments of the present disclosure. Furthermore, in some embodiments, the red filter structure 031, the green filter structure 032, and the blue filter structure 033 may also be formed via the one patterning process, which is not limited in the embodiments of the present disclosure.

In S1103, a protective layer is formed on a side, distal from the base substrate, of the color filter layer.

Figure 13:
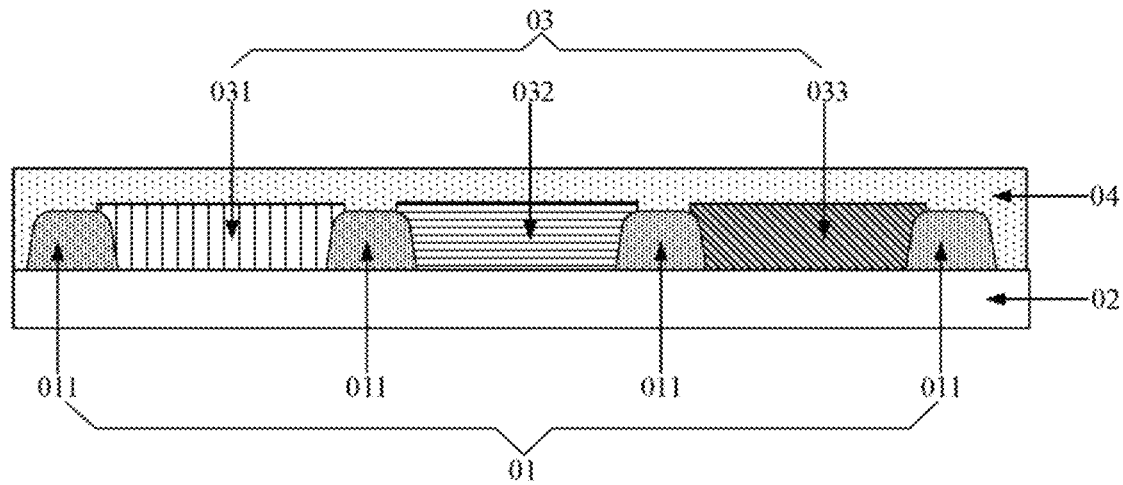
FIG. 13 is a schematic diagram after a protective layer is formed on a side, distal from a base substrate, of a color filter layer according to an embodiment of the present disclosure.

Referring to FIG. 13, FIG. 13 shows a schematic diagram after a protective layer 04 is formed on a side, distal from a base substrate 02, of a color filter layer 03 according to an embodiment of the present disclosure. As shown in FIG. 13, the protective layer 04 covers the color filter layer 03 and a black matrix structure 01. Optionally, the material of the protective layer 04 may be a resin material. Illustratively, a layer of resin material may be coated on the side, distal from the base substrate 02, of the color filter layer 03 as the protective layer 04.

In S1104, a spacer layer is formed on a side, distal from the base substrate, of the protective layer, wherein the spacer layer includes a primary spacer and a secondary spacer, and a height of the primary spacer is greater than a height of the secondary spacer.

For a schematic diagram after the spacer layer is formed on one side of the protective layer 04 away from the base substrate 02, reference may be made to FIG. 3. As shown in FIG. 3, the spacer layer includes a primary spacer 051 and a secondary spacer 052. The height of the primary spacer 051 is greater than the height of the secondary spacer 052. Both the primary spacer 051 and the secondary spacer 052 may be of a truncated cone-shaped structure. Both the shape of a longitudinal section of the primary spacer 051 and the shape of a longitudinal section of the secondary spacer 052 may be trapezoid. Optionally, both the primary spacer 051 and the secondary spacer 052 are of a circular truncated cone-shaped structure, or both the primary spacer 051 and the secondary spacer 052 are of a truncated pyramid-shaped structure, which is not limited in the embodiments of the present disclosure.

Optionally, both the material of the primary spacer 051 and the material of the secondary spacer 052 may be a resin material. Illustratively, a thin resin film is acquired by coating a layer of resin materials on the side, distal from the base substrate 02, of the protective layer 04; the thin resin film is exposed with a half-tone mask plate to allow the thin resin film to form a fully exposed region, a partially exposed region, and an unexposed region; and eventually, the exposed thin resin film is developed, so as to allow the thin resin film in the fully exposed region to be removed completely, the thin resin film in the partially exposed region to be removed partially and the thin resin film in the unexposed region to be retained fully. The primary spacer 051 is formed in the unexposed region, and the secondary spacer 052 is formed in the partially exposed region.

It is easily understood by persons skilled in the art that a sequence of the processes of the method for manufacturing a display substrate according to the embodiments of the present disclosure may be adjusted properly, and some processes may also be added or removed according to conditions. Any person skilled in the art may readily derive modified methods without departing from the technical scope disclosed in the present disclosure, which may fall within the protection scope of the present disclosure. Therefore, details are not repeated again.

In summary, for a method for manufacturing a display substrate according to the embodiments of the present disclosure, as the width of the black matrix strip is less and the distance between any two adjacent black matrix strips is smaller in the display substrate manufactured by using the method, the display substrate may be applicable to the display devices having higher resolution requirements, such as VR devices.

Based on the same inventive concepts, the embodiments of the present disclosure further provide a display device. The display device includes the above-mentioned display substrate. Illustratively, the display device may be a liquid crystal panel, an electronic paper, a mobile phone, a tablet computer, a television, a monitor, a laptop computer, a digital photo frame, a navigator, a VR device, an augmented reality (AR) device, a wearable device, and any other products or components with display functions.

Persons of ordinary skill in the art may understand that all or a part of the foregoing embodiments may be implemented through hardware, or may be implemented by a program instructing relevant hardware. The program may be stored in a computer readable storage medium. The above-mentioned storage medium may be a read-only memory, a magnetic disk, or an optical disk.

Described above are merely exemplary embodiments of the present disclosure, and are not intended to limit the present disclosure. Any modifications, equivalent substitutions, improvements, and the like within the spirit and principles of the disclosure fall within the protection scope of the present disclosure.

What is claimed is:

1. A method for manufacturing the black matrix structure comprising:

forming an initial black matrix structure on a base substrate, the initial black matrix structure comprising a plurality of initial black matrix strips that are intersected with each other, wherein the plurality of initial black matrix strips are of an integral structure formed by stacking a first trapezoidal truncated cone, a cuboid, and a second trapezoidal truncated cone sequentially along a direction facing away from the base substrate, wherein an upper base face of the first trapezoidal truncated cone and an upper base face of the second trapezoidal truncated cone are in contact with two opposite faces of the cuboid respectively, an area of a lower base face of the second trapezoidal truncated cone is larger than an area of a lower base face of the first trapezoidal truncated cone, and a side face of the first trapezoidal truncated cone and a side face of the second trapezoidal truncated cone protrude from a side face of the cuboid respectively; and removing and partially collapsing a structure of the second trapezoidal truncated cone of the initial black matrix strips in the initial black matrix structure that protrudes from the cuboid, with a collapsed portion covering a structure of the first trapezoidal truncated cone that protrudes from the cuboid, so as to acquire a final black matrix structure.

2. The method according to claim 1, wherein removing and partially collapsing the structure of the second trapezoidal truncated cone of the initial black matrix strips in the initial black matrix structure that protrudes from the cuboid, with the collapsed portion covering the structure of the first trapezoidal truncated cone that protrudes from the cuboid comprise:

heating the initial black matrix structure, and bombarding the initial black matrix structure with a plasma, so as to remove and partially collapse the structure of the second trapezoidal truncated cone of the initial black matrix strips in the initial black matrix structure that protrudes from the cuboid, with the collapsed portion covering the structure of the first trapezoidal truncated cone that protrudes from the cuboid.

3. The method according to claim 2, wherein heating the initial black matrix structure and bombarding the initial black matrix structure with the plasma comprise:

heating the initial black matrix structure from a side, distal from the black matrix structure, of the base substrate, and bombarding the initial black matrix structure with the plasma from a side, distal from the base substrate, of the initial black matrix structure.

4. The method according to claim 2, wherein heating the initial black matrix structure and bombarding the initial black matrix structure with the plasma comprise:
heating the initial black matrix structure with infrared rays, and bombarding the initial black matrix structure with a mixed plasma of a helium plasma and an argon plasma.

5. The method according to claim 2, wherein a heating temperature of the initial black matrix structure is greater than or equal to 230 degrees Celsius, and a vacuum pressure of the plasma is less than 100 Pa.

6. The method according to claim 1, wherein forming the initial black matrix structure on the base substrate comprises:
forming a black matrix film layer on the base substrate from a negative photoresist material;
bonding the black matrix film layer to the base substrate by baking the black matrix film layer; and
acquiring the initial black matrix structure by exposing and developing the black matrix film layer sequentially.

7. The method according to claim 1, wherein the black matrix structure comprises: a plurality of black matrix strips that are intersected with each other, wherein a width the black matrix strip ranges from 2 to 2.5 microns, and a distance between any two adjacent black matrix strips in the plurality of black matrix strips ranges from 4 to 5 microns.

8. The method according to claim 7, wherein a slope angle of the black matrix strip ranges from 80 to 85 degrees.

9. The method according to claim 8, wherein a first section of the black matrix strip is in a chamfered isosceles trapezoid shape, and the first section is parallel to a width direction of the black matrix strip and perpendicular to a length direction of the black matrix strip.

10. The method according to claim 9, wherein a vertex angle of the chamfered isosceles trapezoid is an arc-shaped chamfer, and the vertex angle of the chamfered isosceles trapezoid is an included angle between an upper base of the chamfered isosceles trapezoid and legs of the chamfered isosceles trapezoid.

11. The method according to claim 10, wherein the vertex angle of the chamfered isosceles trapezoid ranges from 95 to 100 degrees.

\* \* \* \* \*